Patented Sept. 20, 1949

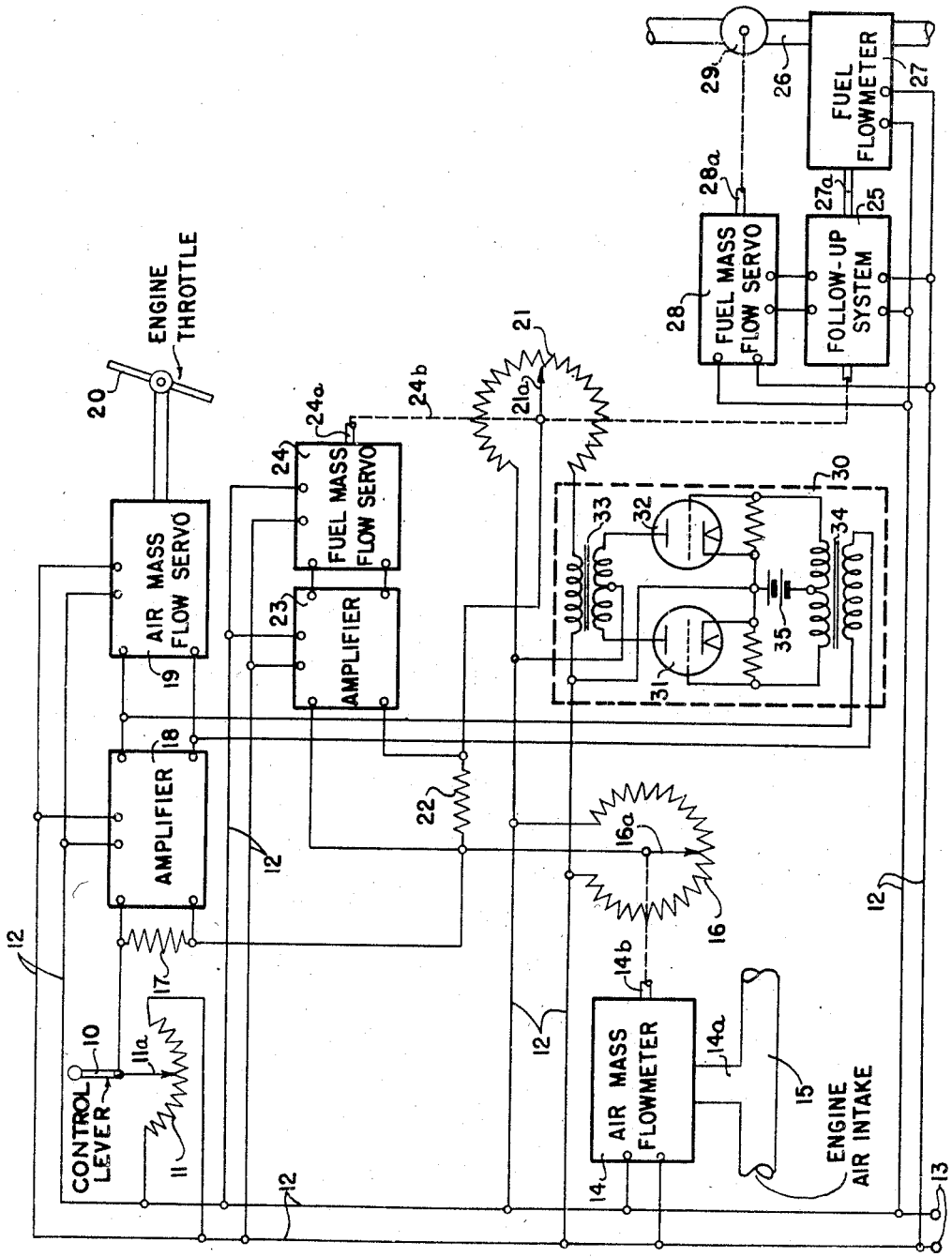

2,482,254

UNITED STATES PATENT OFFICE 2,482,254

FUEL-AIR RATIO CONTROL SYSTEM

Sherman M. Fairchild, Huntington, N. Y., assignor to Fairchild Camera and Instrument Corporation, a corporation of Delaware Application November 8, 1944, Serial No. 562,550

5 Claims. (Cl. 261—64)

This invention relates to systems for controlling the fuel-air ratio of the input to an internal combustion engine and, while it is of general application, it is particularly suitable for application to aircraft engines.

It is well known that it is desirable to minimize the many controls which must be operated by the pilot of an aircraft, particularly a military aircraft in which there must be a minimum of distraction of the pilot from the tactical operation of the craft. At the same time such an aircraft must necessarily operate over extremely wide ranges of operating conditions such as temperature, barometric pressure, speed, acceleration, rate of climb, etc., variations of any of which conditions substantially impair the operation of the aircraft engine if the supply of air and fuel thereto is not properly varied to maintain an optimum fuel-air ratio. For example, upon a rapid opening of the throttle to obtain increased power necessary for acceleration, there is an inherent time lag in the response of the conventional aircraft carburetor to increase the fuel flow to the engine in accordance with the increase in the air-mass flow, with the result that the fuel-air ratio tends to become too low, that is too lean, resulting in backfiring, loss of power, etc. While it is customary to compensate for this effect, at least in part, by the use of acceleration pumps, these devices leave much to be desired in the accurate compensation of this acceleration effect. This effect may be particularly troublesome in certain types of carburetors in which the number of adjustments required of the pilot have been reduced to a minimum by the inclusion of devices for automatically compensating for variations in certain basic operating conditions, such as power requirements, speed, temperature, barometric pressure, etc. At the same time, in such an automatic or semi-automatic system, it is particularly desirable to avoid any additional adjustment to be made by the pilot for increasing the fuel-air ratio during acceleration. The invention is particularly suitable for embodiment in a system for automatically controlling the air-mass flow and the fuel-mass flow to an aircraft engine such as described and claimed in the copending application of David W. Moore, Jr. entitled "Method of and system for controlling the input to an internal combustion engine," Serial No. 562,556, filed concurrently herewith and assigned to the same assignee as the present application and the invention will be described as embodied in such a system.

It is an object of the invention therefore to provide a new and improved system for controlling the fuel-air ratio of the input to an aircraft internal combustion engine in which the fuel-air ratio is increased during acceleration automatically and without the addition of any other adjustments to be made by the pilot.

In accordance with the invention, a system for controlling the fuel-air ratio of the input to an internal combustion engine under variable operating conditions comprises means for developing a first electrical signal varying with the air-mass flow to the engine, means for developing a second electrical signal varying with the fuel-mass flow to the engine, and means responsive jointly to such electrical signals for controlling the fuel-air ratio of the input to the engine. The system also includes means for developing a third electrical signal representative of the acceleration of the engine and means for utilizing such third electrical signal to increase the fuel-air ratio during acceleration.

Further in accordance with the invention, a system for controlling the fuel-air ratio of the input to an internal combustion engine in response to varying power requirements, the engine including independently adjustable air and fuel intake valves, comprises control means for developing a first electrical signal representative of the power requirements of the engine, means for developing a second electrical signal varying with the air-mass flow to the engine and means responsive jointly to such electrical signals for adjusting the air intake valve of the engine. The system also includes means for developing a third electrical signal representative of the fuel-mass flow to the engine, means responsive jointly to the second and third electrical signals for adjusting the fuel intake valve of the engine, and means for modifying the action of the last-named means in accordance with the rate of change of the setting of the control means to increase the fuel-air ratio during acceleration. The ordinals first, second, third, etc., as used in the foregoing general statements of the invention and in the appended claims are not necessarily consistent throughout but are used in each context merely for the sake of convenience and to provide short antecedents for the several elements and effects described.

For a better understanding of the invention, together with other and further objects thereof, reference is had to the following description taken in connection with the accompanying drawings while its scope will be pointed out in the appended claims.

Referring now to the drawings, the single figure is a schematic representation of a system for controlling the fuel-air ratio of the input to an internal combustion engine of the type described and claimed in the aforesaid copending application of David W. Moore, Jr., embodying the means of the present invention for increasing the fuel-air ratio during acceleration.

Referring now to the drawing, there is represented a system for controlling the fuel-air ratio of the input to an internal combustion engine under variable operating conditions, such as varying power requirements, the engine including independently adjustable air and fuel intake valves. This system comprises means for developing a first electrical signal, representative of the power requirements of the engine. This means may comprise a control means or device such as a control lever 10 cooperating with a voltage modulator or divider 11 including an adjustable element or contact 11a settable to a position representative of the power requirements. The voltage divider 11 is connected across an alternating current supply circuit or control power circuit 12 connected to supply terminals 13 and adapted to provide necessary control power for the various elements of the system.

The system also includes means for developing a second electrical signal, varying with the air-mass flow to the engine. This means may comprise an air-mass flow meter 14 having a fluid connection 14a to the engine air intake conduit 15 and provided with an actuating shaft 14b connected to an adjustable element 16a of a second voltage divider 16 connected across the control circuit 12, the element 16a being adjustable in accordance with the air-mass flow to the engine to develop a correspondingly varying electrical signal.

The system also includes means responsive jointly to the first and second electrical signals for adjusting the air intake valve of the engine. Specifically, the voltage dividers 11 and 16 connected in parallel across the supply circuit 12 comprise a first Wheatstone bridge circuit, one diagonal of which comprising the adjustable elements 11a and 16a are interconnected through a balancing resistor 17. There is also provided a vacuum tube amplifier 18 having its input circuit connected across the resistor 17 and thus constituting means responsive to an unbalance of the bridge circuit. The output circuit of the amplifier 18 is connected to an air-mass flow servo unit 19, which may be of any suitable type and is connected to actuate the engine throttle 20 constituting the main air intake valve of the engine carburetor.

The system further includes means for developing a third electrical signal, which is non-reactive on the air-mass flow meter 14 and its associated voltage divider 16 and which is representative of the fuel-mass flow to the engine. Specifically, this means comprises a third voltage divider 21, including an adjustable contact element 21a, settable to a position representative of the fuel-mass flow to the engine. There is also provided in the system means responsive jointly to the second and third signals described for adjusting the fuel-air ratio of the input to the engine. This means may include a second Wheatstone bridge circuit comprising the voltage dividers 16 and 21, the adjustable elements of which are interconnected through a balancing resistor 22. A unidirectionally acting relay means such as a vacuum tube relay or amplifier 23 is provided with an input circuit connected across the resistor 22 and constitutes means for comparing the second and third signals developed by the voltage divider 16 and 21, respectively; that is it constitutes means responsive to an unbalance of the second bridge circuit.

The system of the invention also includes means actuated by the relay means or amplifier 23 for adjusting the fuel intake valve of the engine. This means comprises a fuel-mass flow servo 24 energized from the amplifier 23 and having an actuating shaft 24a connected by a mechanism indicated schematically at 24b to adjust the element 21a of the voltage divider 21 to restore to balance the bridge circuit comprising the voltage dividers 16 and 21 and also connected to set an adjustable element of a follow-up system 25. The fuel inlet conduit 26 of the engine includes a fuel flowmeter 27 which is connected by a shaft 27a to set the other element of the follow-up system 25. The electrical unbalance developed by the follow-up system 25 is connected to a fuel-mass flow servo 28 provided with an actuating shaft 28a connected to adjust an intake valve 29 in the fuel intake line 26.

The system of the invention also includes means for developing a fourth effect, such as a fourth electrical signal, representative of the acceleration of the engine and means for utilizing such effect or signal to increase the fuel-air ratio during acceleration. Specifically the fourth electrical signal may comprise the unbalance potential of the first bridge circuit, that is the difference between the first and second electrical signals appearing across resistor 17, as amplified by amplifier 18. This signal is utilized to modify the third signal, that is the electrical signal developed by the voltage divider 21 by introducing it in series with the voltage divider 21 and therefore in series with the third electrical signal, the resultant being utilized to increase the fuel-air ratio. For example, the output circuit of amplifier 18 may be connected to a phase responsive device 30, connected in series with the voltage divider 21 across the control circuit 12. The phase responsive device 30 may be of any of several types well known in the art but as shown comprises a pair of vacuum tubes 31, 32 connected in push-pull to the primary winding of a transformer 33, the secondary winding of which is connected in series with the voltage divider 21 across the control circuit 12. The vacuum tube circuit is excited directly from the control circuit 12. The control grids of the vacuum tubes 31, 32 are excited in push-pull through a grid transformer 34, the primary winding of which is connected to the output circuit of amplifier 18. A bias battery 35 is included in the common grid circuit of the tubes 31, 32 and is selected of such a value as to bias the tubes 31, 32 in the vicinity of cut-off.

Each of the several units of the system illustrated in schematic form may, per se, be of conventional construction well-known in the art so that a detailed description thereof is unnecessary. For example, the air-mass flow meter 14, together with the voltage divider 16, may correspond to the air-mass flow unit 13 in the aforesaid copending application. Further, the amplifier 18 and the air-mass flow servo 19 may correspond to the throttle adjusting unit 41 of such copending application. Again, the amplifier 23, fuel-mass flow servo 24 and voltage divider 21 may together be in the form of the air-fuel flow comparing unit 49 of such copending application, while the follow-up system 25, the fuel-flow meter 27 and the fuel-mass flow servo 28 may together comprise the fuel-flow measuring and setting unit 72 of such copending application. Generally, each of the control units just mentioned are of the electrical type and may be energized in common from the alternating current supply and control circuit 12 as indicated.

In explaining the operation of the above described fuel-air ratio control system, it will be assumed that initially the system is in equilibrium with the engine throttle adjusted to the setting corresponding to the particular power requirements of the engine. If now the control lever 10 is adjusted clockwise as referred to the drawing, that is, is set to increase the power output of the engine to a new desired value, it is effective to develop at the adjustable contact 11a an increased first electrical signal representative of the desired engine power. Therefore, a differential signal appears across resistor 17 and this signal is amplified in amplifier 18 and applied to the air-mass flow servo 19 which is effective to adjust the engine throttle 20 to the new power requirements setting. This adjustment will be effective to increase the air-mass flow to the engine, whereupon the unit 14 is effective to adjust the element 16a of voltage divider 16 to rebalance the first bridge circuit comprising the voltage dividers 11 and 16.

If, for any given setting of the control lever 10, the air flow to the engine varies due to the variation of the speed of the engine, variation in the altitude of flight, and therefore in the density of the air, or for any other cause, the air-mass flow meter 14 will respond to such variations and will actuate the adjustable element 16a of voltage divider 16 to develop at the adjustable contact 16a a second electrical signal of different value for a comparison with the first electrical signal developed at the adjustable contact 11a. In such case, the system will operate as described above to adjust the engine throttle 20 to the appropriate position to restore the system to balance.

Whenever there is an adjustment of the air-mass flow to the engine as described above, resulting in an adjustment of the element 16a of voltage divider 16, the fuel-air ratio of the input to the engine is disturbed. This is evidenced by an unbalance of the bridge circuit including voltage dividers 16 and 21, the unbalance or difference between the second and third electrical signals appearing across resistor 22. This unbalance voltage is amplified in unit 23 which is connected to the fuel-mass flow servo 24, which in turn adjusts the element 21a of voltage divider 21 to restore this second bridge circuit to balance. At the same time, the fuel-mass flow servo 24 adjusts the settable element of a follow-up system 25. At the same time, the fuel flow meter 27 continuously measures the actual fuel flow to the engine and sets the secondary element of the follow-up system 25 to a position corresponding to such actual fuel flow. Under the conditions assumed, the follow-up system 25 is unbalanced and the unbalanced voltage thereof is applied to the fuel-mass flow servo 28, the shaft 28a of which is effective to actuate the valve 29 in the fuel intake line of the engine to such a setting that the actual fuel flow through the line 26 corresponds to the requirements setting as determined by the fuel-mass flow servo 24. At the same time, the secondary element of the follow-up system 25 is adjusted by the fuel flow meter 27 to a position corresponding to that of its primary element as determined by the fuel-mass flow servo 24 to restore the fuel determining system and to determine the proper fuel-air ratio of the input to the engine.

The foregoing operation has been described on the assumption that the changes in power requirements have been sufficiently gradual that there is no substantial lag in the system in following the setting of the power requirements lever 10. On the other hand, if the lever 10 is shifted in position rapidly and to a substantial extent, there may be a considerable lag in the operation of the system in following the change in setting of the lever 10. This will ordinarily result in a lowering of the fuel-air ratio of the input to the engine at the very time that this ratio should be somewhat increased. In order to compensate for this effect and in order temporarily to enrich the fuel-air mixture during acceleration, there is provided the circuit arrangement described for introducing the amplified unbalanced voltage acoss resistor 17 in series with a voltage divider 21, which is primarily effective in determining the actual fuel-mass flow to the engine. However, in case of a sudden decrease in the power requirements of the engine, it is necessary to avoid a corresponding decrease in the fuel-air ratio which would impair the operation of the engine. This effect is avoided by the phase responsive device 30 in the unbalanced voltage appearing at the output circuit of amplifier 18 supplied by way of transformer 34 to the grids of the tubes 31, 32 connected in push-pull. The connections are such that upon adjustment of lever 10 corresponding to increased power requirements the polarity or phase of the voltage applied to the grids of the tubes 31, 32 is the same as that applied to their respective anodes in the control circuit 12. Under these conditions, the tubes 31, 32 are effective to repeat and amplify the differential voltage and connect it in series with the voltage divider 21 across the control circuit 12, thus effectively increasing the potential applied to the voltage divider 21 and the signal appearing at the adjustable contact 21a. This increase in potential at contact 21a produces a differential potential across resistor 22 which is effective to increase the fuel-mass flow to the engine in exactly the same manner as though the unbalance across the resistor 22 were produced by an increase in the air-mass flow to the engine, as described above. On the other hand, if the control lever 10 is operated to decrease the power requirements of the engine, the phase or polarity of the potential applied to the grids of the tubes 31, 32 will be reversed and will be opposite to that of their anode potentials with the result that the tubes 31, 32 are substantially non-conductive due to the bias of their grids in the vicinity of cut-off by means of a battery 34. Similarly, during normal operation of the system when it is in equilibrium or during adjustment of the control lever 10 at a sufficiently gradual rate that the system follows closely changes in the setting of such control lever, substantially no potential appears at the output of the amplifier 18, the phase responsive device 30 is substantially unresponsive and no potential is introduced in series within the voltage divider 21.

While there has been described what is at present considered to be the preferred embodiment of the invention, it will be apparent to those skilled in the art that various changes and modifica-

What is claimed as new is:

1. A system for controlling the fuel-air ratio of the input to an internal combustion engine under variable operating conditions comprising, means for developing a first electrical signal varying with the air-mass flow to the engine, means for developing a second electrical signal varying with the fuel-mass flow to the engine, means responsive jointly to said electrical signals for controlling the fuel-air ratio of the input to the engine, means for developing a third electrical signal representative of the acceleration of the engine, and means for modifying said second electrical signal with said third electrical signal and utilizing the resultant to increase said fuel-air ratio during acceleration.

2. A system for controlling the fuel-air ratio of the input to an internal combustion engine under variable operating conditions comprising, means for developing a first electrical signal varying with the air-mass flow to the engine, means for developing a second electrical signal varying with the fuel-mass flow to the engine, unidirectionally acting relay means for comparing said signals, means actuated by said relay means for controlling the fuel-air ratio of the input to the engine, means for developing a third electrical signal representative of the acceleration of the engine, and means for modifying said second electrical signal with said third electrical signal and utilizing the resultant to increase said fuel-air ratio during acceleration.

3. A system for controlling the fuel-air ratio of the input to an internal combustion engine in response to varying power requirements, said engine including independently adjustable air and fuel intake valves, comprising, control means for developing a first electrical signal representative of the power requirements of the engine, means for developing a second electrical signal varying with the air-mass flow to the engine, means responsive jointly to said first and second electrical signals for adjusting the air intake valve of the engine, means for developing a third electrical signal representative of the fuel-mass flow to the engine, means responsive jointly to said second and third electrical signals for adjusting the fuel intake valve of the engine, and means responsive to the difference between said first and second signals for modifying said third signal to increase the fuel-air ratio during acceleration.

4. A system for controlling the fuel-air ratio of the input to an internal combustion engine in response to varying power requirements, said engine including independently adjustable air and fuel intake valves, comprising, control means for developing a first electrical signal representative of the power requirements of the engine, means for developing a second electrical signal varying with the air-mass flow to the engine, means responsive jointly to said first and second electrical signals for adjusting the air intake valve of the engine, means including a voltage divider for developing a third electrical signal representative of the fuel-mass flow to the engine, means responsive jointly to said second and third electrical signals for adjusting the fuel intake valve of the engine, and means for introducing the difference between said first and second signals in series with said voltage divider to increase the fuel-air ratio during acceleration.

5. A system for controlling the fuel-air ratio of the input to an internal combustion engine in response to varying power requirements, said engine including independently adjustable air and fuel intake valves, comprising, a first voltage divider including an element settable to a position representative of the power requirements of the engine, a second voltage divider including an element adjustable in accordance with the air-mass flow to the engine, a first bridge circuit including said voltage dividers, means responsive to an unbalance of said bridge circuit for adjusting the air intake valve of the engine, a third voltage divider including an element settable to a position representative of the fuel-mass flow to the engine, a second bridge circuit including said second and third voltage dividers, means responsive to an unbalance of said second bridge circuit for adjusting the fuel intake valve of the engine, and means for introducing the unbalance potential of said first bridge circuit in series with said third voltage divider to increase the fuel-air ratio during acceleration.

SHERMAN M. FAIRCHILD.

REFERENCES CITED

The following references are of record in the file of this patent:

UNITED STATES PATENTS

| Number | Name | Date |
|---|---|---|
| 877,312 | Evershed | Jan. 21, 1908 |
| 1,886,575 | O'Connor | Nov. 8, 1932 |
| 2,281,411 | Campbell | Apr. 28, 1942 |
| 2,285,344 | Marples | June 2, 1942 |
| 2,300,537 | Davis | Nov. 3, 1942 |
| 2,316,300 | Udale | Apr. 13, 1943 |
| 2,330,650 | Weiche | Sept. 28, 1943 |
| 2,372,356 | Chandler | Mar. 27, 1945 |
| 2,391,755 | Twyman | Dec. 25, 1945 |
| 2,395,648 | Teichert | Feb. 26, 1946 |
| 2,399,077 | Udale | Apr. 23, 1946 |

FOREIGN PATENTS

| Number | Country | Date |
|---|---|---|
| 523,895 | Great Britain | July 25, 1940 |